(No Model.)
E. W. COOKE.
MEASURING APPARATUS FOR FILLING STREET LAMPS.
No. 411,375. Patented Sept. 17, 1889.
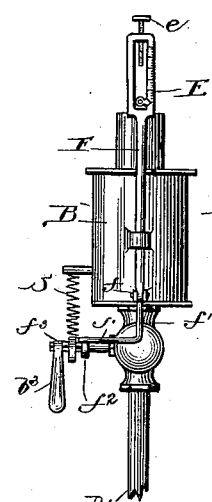
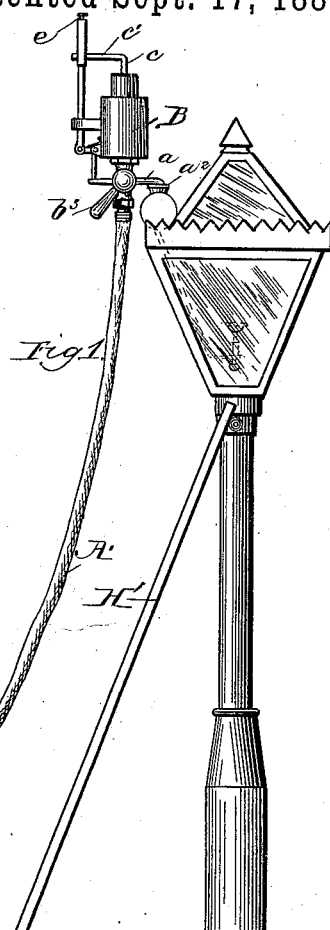
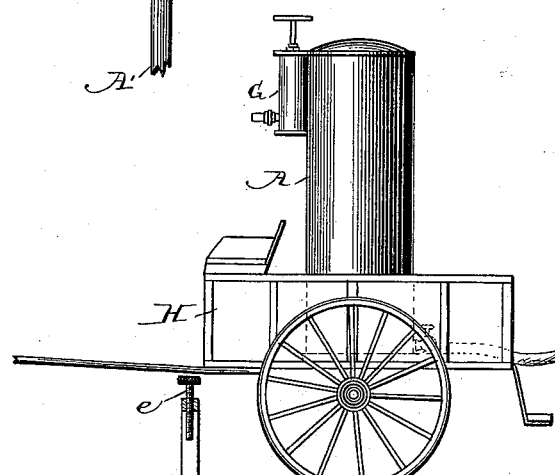
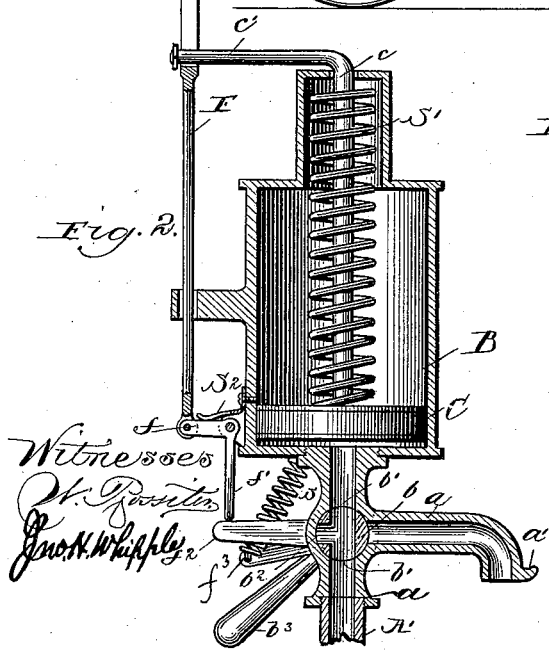
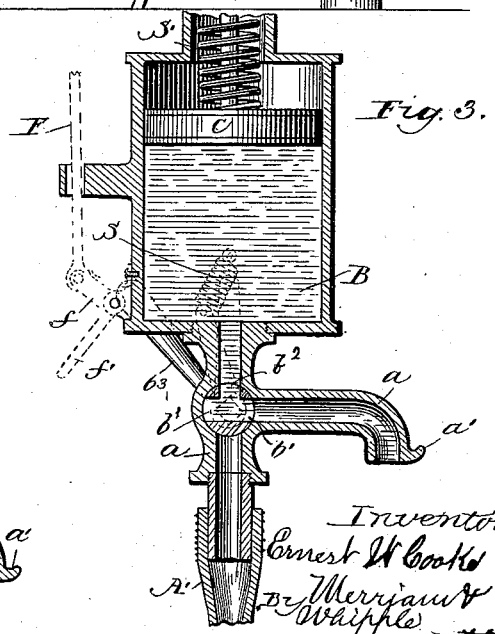

(No Model.) 2 Sheets—Sheet 2.
E. W. COOKE.
MEASURING APPARATUS FOR FILLING STREET LAMPS.
No. 411,375. Patented Sept. 17, 1889.
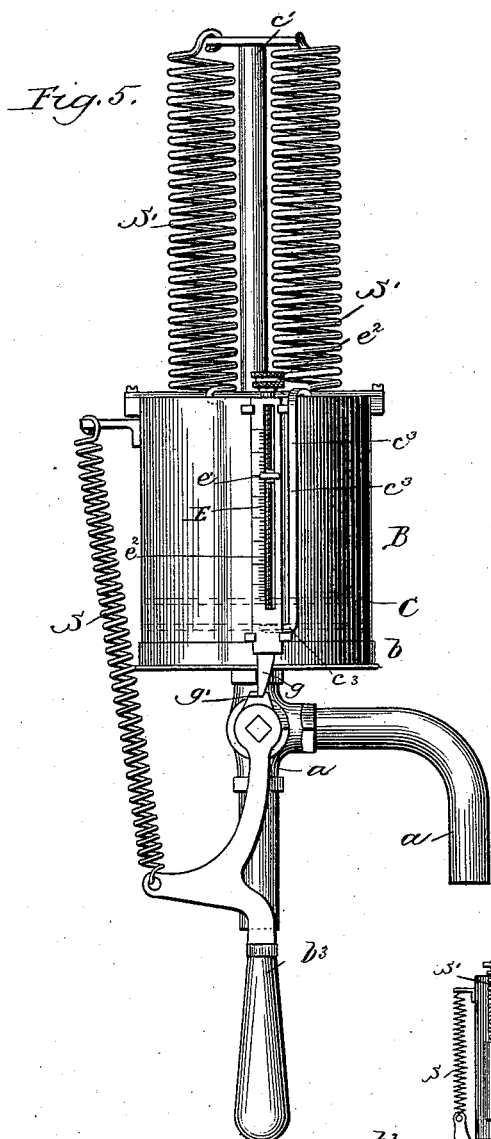
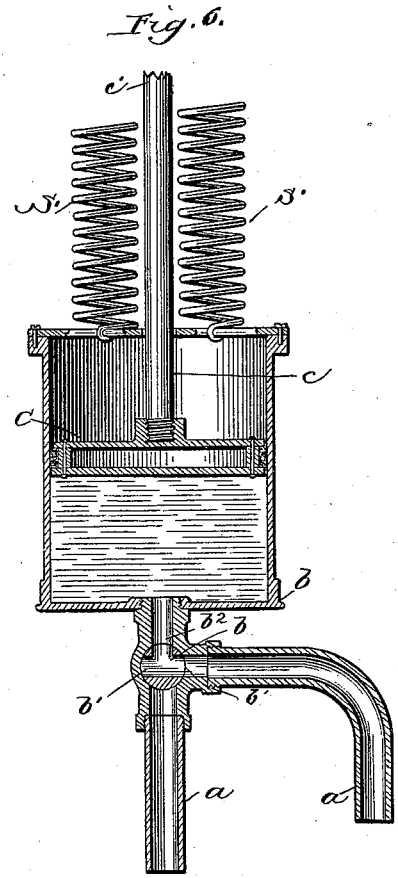
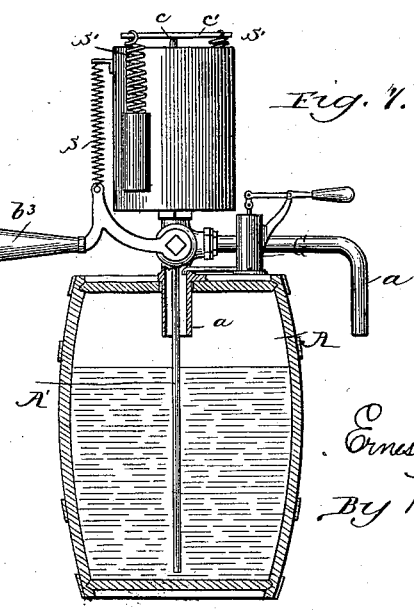
Witnesses
Inventor
Ernest W. Cooke
By Merriam & Whipple
Attys.

UNITED STATES PATENT OFFICE.

ERNEST W. COOKE, OF CHICAGO, ILLINOIS, ASSIGNOR OF ONE-THIRD TO CHARLES P. WARREN.

MEASURING APPARATUS FOR FILLING STREET-LAMPS.

SPECIFICATION forming part of Letters Patent No. 411,375, dated September 17, 1889.

Application filed March 27, 1889. Serial No. 305,030. (No model.)

*To all whom it may concern:*

Be it known that I, ERNEST W. COOKE, of Chicago, in the State of Illinois, have invented certain new and useful Improvements in Apparatus for Charging Street-Lamps, of which the following is a specification.

My invention relates to apparatus for charging street-lamps in which an attachment for measuring the charge is used in conjunction with the oil-supply reservoir; and the objects of my improvements are, first, to provide a portable oil-supply reservoir having a charge-measuring attachment connected directly therewith by a flexible connection, whereby the apparatus may be conveniently applied to charge a lamp, and, second, to provide the charge-measuring attachment with means for automatically shutting off the flow of oil from the supply-reservoir to the measuring-chamber and simultaneously emptying the charge into the lamp-reservoir. I have attained these objects by the apparatus and mechanism illustrated in the accompanying drawings, in which—

Figure 1 represents a side elevation of my apparatus as applied in charging a street-lamp. Fig. 2 is a central section of the charge-measuring attachment, enlarged, the oil-chamber being closed. Fig. 3 is a like view representing the oil-chamber filled with a charge of oil. Fig. 4 is a side elevation of the charge-measuring attachment as viewed from the left and at right angles to the plane of the section shown in Fig. 2. Fig. 5 is a side elevation of a modification of the charge-measuring attachment, showing a different arrangement of parts to that of the views shown on the first sheet of drawings. Fig. 6 is a vertical central section of Fig. 5. Fig. 7 shows the charge-measuring attachment as applied directly to an oil-barrel for measuring out the oil; also, a different arrangement of springs.

A designates the portable oil-supply reservoir, which is made of the required size to carry oil enough to fill a considerable number of lamps. It is made to close air-tight and to sustain sufficient internal air-pressure to force the oil out through the charge-measuring attachment as required in charging lamps. Such reservoir is provided with a flexible hose $A'$, for letting the oil out, whereby it may, when brought sufficiently near to the lamp, be conveniently connected therewith. The nozzle $a$ of said hose is provided with a hook-like point $a'$, adapted to hook into the opening $a^2$ of the lamp-reservoir, as ordinarily constructed, and hold the hose in place during the charging process. Back from the open end of the nozzle there is a two-port valve $b$, having a port $b'\ b'$ for admitting oil through the hose to the expanding chamber B of the charge-measuring attachment, and a port $b^2\ b'$ for emptying the oil from said chamber through the hose-nozzle into the lamp-reservoir, when the end $b^2$ of said port is brought to coincide with the opening to said chamber. Said ports are relatively arranged so that when the way through the hose to said expanding chamber is open the way from said chamber out through the nozzle will be closed, and when the way out through the nozzle is open the way through to said hose will be closed. The shaft of said valve is provided with a handle $b^3$ for opening and closing said ports.

The expanding chamber of the charge-measuring attachment, as shown in Figs. 1 to 4, inclusive, is provided with a sliding partition or disk C, having a rod $c\ c'$ attached thereto and arranged to operate in connection with a graduated scale E and an adjustable stop $e$ on a sliding bar or rod F, supported on the said chamber, all substantially as shown and described in a separate application, Serial No. 299,496, made by me February 11, 1889, for a patent therefor. These parts are therefore not more particularly described here. The lower end of said rod F, as here shown, is pivoted to one of the arms of a bell-crank $f$, which is hinged to the side of the expanding chamber. The other arm $f'$ of said bell-crank engages with an arm $f^2$ of the shaft of valve $b$ in such manner as to hold open the port $b'\ b'$ thereof, and there is a spring S, connected to an arm $f^3$ of said valve-shaft and to a projection on said chamber, which presses said shaft in the opposite direction or pulls the arm $f^2$ against the end of arm $f'$. When said last-mentioned arm is tripped or released from the arm $f^2$, said spring will turn the valve-shaft back a quarter-revolution, and thereby close the port $b'\,b'$ and open $b^2\,b'$.

The rod F is raised or moved by the rod $c\,c'$ of the sliding partition coming against the stop $e$ as said partition is pushed upward or moved out of the way by the oil coming into the expanding chamber, and the bell-crank is tripped automatically thereby when the required charge is admitted into said chamber.

By means of the adjustability of the stop relatively to the scale the tripping of the bell-crank may be timed so as to vary the charge of oil to correspond with the varying time which the different lamps may be required to burn.

In the modification of the charge-measuring attachment, as shown in Figs. 5 to 7, inclusive, the graduated scale is placed down on the side of the expanding chamber B, and a rod $c^3$ is connected with the sliding partition C and extended up to the top of said chamber, and then over the top and down to the trip mechanism, which, as here shown, is a spring-pressed latch $g$, adapted to engage with a lug $g'$ on the valve-shaft for holding open the port $b'\,b'$ to admit oil into the expanding chamber. This latch is raised by the curved end of said rod $c^3$ striking against the adjustable stop $e'$ on a screw-rod $e^2$, pivotally connected to the upper end of said latch and threaded through said stop, so that by turning the same to the right or left said stop will be thereby moved up or down on said screw-rod to any desired point on the graduated scale. As the bent end of the rod $c^3$ comes against the stop $e'$ said screw-rod will be raised and lift said latch out of engagement with the lug on the valve-shaft and leave the same free, so that the port $b'\,b'$ will be closed by the action of the spring S.

The spring or springs S' may be applied in any of the ways shown in Figs. 2, 5, or 7. By attaching said spring or springs to the sliding partition and to the top of said expanding chamber, and shortening them up by bringing the coils normally close together, they may be made to lift said sliding partition from the bottom of said expanding chamber and draw the oil up by suction. In such case the said springs would be extended and the oil would be forced out of said chamber by bearing down on the rod $c\,c'$ with the hand.

I contemplate forcing the oil out of the portable supply-reservoir either by sufficient air-pressure created within it at the start or by an ordinary air-pump, as G, attached to said reservoir, so that the pressure can be applied as needed by the operator.

By using a light cart, as H, the portable apparatus, together with a ladder H' for getting up to the lamps, may be conveniently carried about from lamp to lamp.

The operation is as follows: On reaching a lamp to be filled and lighted the attendant should first observe the time and adjust the stop to agree therewith on the graduated scale, then hook the nozzle into the opening $a^2$ of the lamp, then turn the valve so as to open the way through the hose to expanding chamber, and set the bell-crank, as shown in Fig. 2, to hold it open until the charge is admitted to said chamber. He can then proceed to trim the lamp preparatory to lighting it, and light it as soon as the bell-crank is tripped. After the lighting the nozzle may be unhooked and the apparatus carried to another lamp, where the above-described operation may be repeated. For the purpose of hastening the emptying of the charge into the lamp, I arrange a spring S' between the sliding partition and the top of the expanding chamber in such manner as to be compressed by said partition as it is raised by the incoming charge, so that when the way out through the nozzle is open said spring will tend to push said partition back, and thus aid in forcing the oil out.

A light spring $S^2$ is arranged to hold the bell-crank normally in position to engage the arm $f^2$ of the valve-shaft automatically when said shaft is turned so as to open the way through the hose to the expanding chamber.

What I claim is—

1. An apparatus for charging street-lamps, consisting of a portable oil-supply reservoir and a charge-measuring attachment having an expanding and contracting chamber, in combination with a flexible hose provided with a nozzle adapted to connect the apparatus with the opening of lamps to be filled, and a three-way valve at its junction with said chamber for admitting oil from said reservoir thereto through said hose and discharging the same therefrom through said nozzle, whereby the measuring attachment of such apparatus through the flexibility of said hose is adapted to fill lamps in various positions relative to said apparatus within the reach of said hose, as specified.

2. In a lamp-charging apparatus, the combination, with an expanding charge-measuring chamber, of a spring-pressed two-port valve, one port for opening and closing a way through a pipe into said chamber and the other for opening and closing a way out of said chamber through the opposite end of said pipe, trip mechanism, substantially as described, for holding open said port into said chamber, and a tripping-rod for connecting such trip mechanism with the moving part of such expanding chamber for automatically tripping the same, substantially as specified.

ERNEST W. COOKE.

Witnesses:
JNO. H. WHIPPLE,
JOS. W. MERRIAM.